May 12, 1931.  S. I. LEVY  1,805,100
TREATMENT OF COPPER RICH MATERIAL
Original Filed March 1, 1928
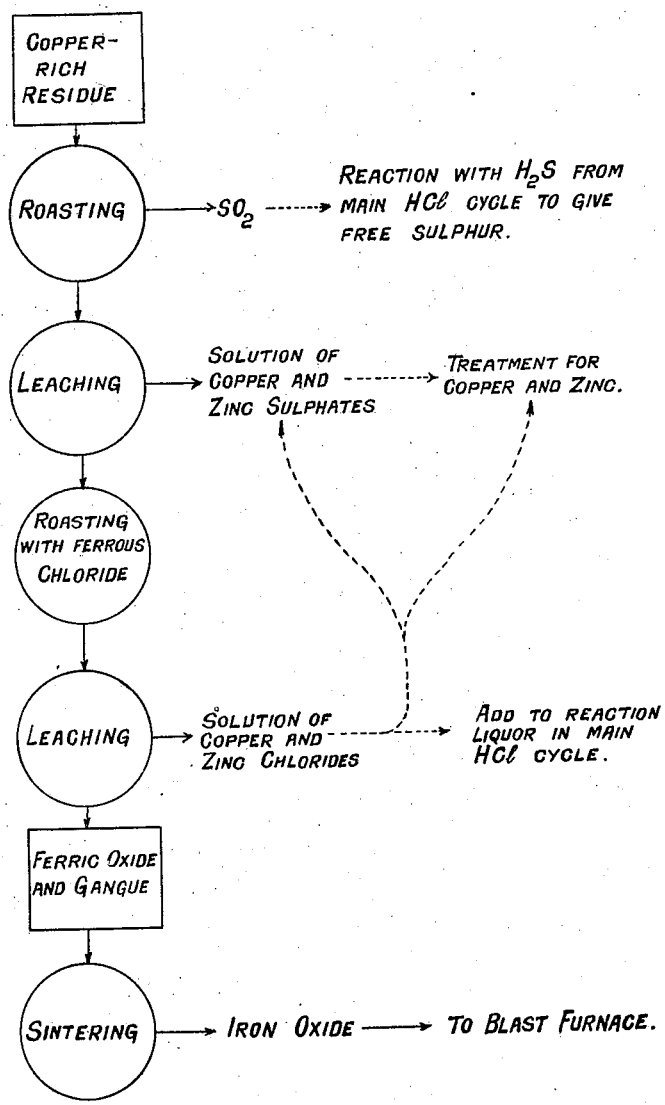

Patented May 12, 1931

1,805,100

UNITED STATES PATENT OFFICE

STANLEY ISAAC LEVY, OF LONDON, ENGLAND

TREATMENT OF COPPER RICH MATERIAL

Original application filed March 1, 1928, Serial No. 258,439, and in Great Britain February 10, 1928. Divided and this application filed April 26, 1929. Serial No. 358,350.

This invention, which is a division of my copending application Serial No. 258,439 filed 1st March 1928, relates to the treatment of copper-rich residues obtained in the treatment of iron pyrites for the recovery therefrom of the metals and also, if desired, of the sulphur.

In the specification of a co-pending application Serial No. 259,317 filed 5th March 1928, I have described a process of obtaining crude sulphur and pure sulphur by heating the pyrites in the absence of air leaving a "mainly soluble" residue and then reacting on the "mainly soluble" residue with hydrochloric acid. As a result of such reactions ferrous chloride and lead chloride pass into solution and sulphuretted hydrogen is evolved.

The residue from the treatment with hydrochloric acid solution of the "mainly soluble" residue contains sulphides of iron, copper and zinc, together with some free sulphur and all the insoluble silicious matter from the original pyrites and is hereinafter referred to as the copper-rich residue. This residue may be smelted directly for copper, but the other valuable elements are lost in this case.

In accordance with the present invention, the copper-rich residue is subjected to an oxidizing treatment with air as a result of which the subsequent operations are facilitated.

If the copper-rich residues be roasted in air in a mechanical furnace at a temperature not exceeding 600° C., the iron is converted to ferric oxide, and the zinc and copper largely into the sulphates, while that part of the sulphur not so consumed is converted into sulphur dioxide. The sulphur dioxide, which passes off from the furnace together with the nitrogen and excess of oxygen, is caused to react in known manner with sulphuretted hydrogen, obtained from the hydrochloric acid treatment of the "mainly soluble" residue referred to above, the amount of free oxygen in the gases being adjusted so that it is sufficient to burn to sulphur in known manner any excess of hydrogen sulphide left after the sulphur dioxide has reacted. The reactions are represented by the following equations:—

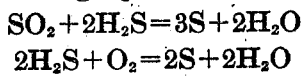

$$SO_2 + 2H_2S = 3S + 2H_2O$$
$$2H_2S + O_2 = 2S + 2H_2O$$

By this means the greater part of the sulphur in the residue is obtained in the pure elemental condition. Such sulphur is collected in known manner.

The roasted residue is now extracted with water or dilute acid when about 80% of the copper and zinc present pass into the solution, from which they may be removed by electrolysis or precipitation in known manner. The final residue of ferric oxide containing the remainder of the zinc and copper may be added to a further quantity of pyrites undergoing treatment, as described in the specification of my co-pending application for patent Serial No. 257,092 filed 25th February 1928 or such residue may be mixed with a small quantity of solid ferrouschloride and again roasted, as a result of which the remainder of the copper and zinc are rendered soluble. The mixture is then again extracted with water or dilute acid, and the final residue of insoluble iron oxide and silicious material sintered in the usual way. The copper and zinc may be removed from the solution so obtained directly by electrolysis or precipitation or otherwise in known manner; or this solution may be treated together with the copper and zinc solution obtained after the oxidizing roast described above; or it may be added to the reaction mixture of "mainly soluble" residue and hydrochloric acid liquor referred to above, in which case the copper is precipitated with the residue again, whilst the zinc remains in the chloride solution, and is recovered therefrom by a concentration process, as described in the specification of my co-pending applications for patent Serial Nos. 259,317 and 257,091 filed 5th March 1928 and 25th February 1928.

The various stages respectively of the process are indicated in the accompanying flow sheet.

I claim,

A process for the recovery of copper and zinc from the residues left on treatment of the "mainly soluble" residue from iron pyrites with hydrochloric acid, consisting in roasting such residue in air, whereby the copper and zinc are converted into sulphates, extracting the roasted residue thus obtained with solvent, chloridizing the residue left after extraction of the roasted residue by roasting with ferrous chloride, and extracting the residue after the chloride roasting operation.

In testimony whereof I have affixed my signature.

STANLEY ISAAC LEVY.